United States Patent
Faccia

Patent Number: 5,143,449
Date of Patent: Sep. 1, 1992

[54] FIBROUS PRODUCT MIXING TRUCK

[76] Inventor: Tiziano Faccia, Via Padova 102 - 35026, Conselve, Italy

[21] Appl. No.: 742,186

[22] Filed: Aug. 2, 1991

Related U.S. Application Data

[63] Continuation of Ser. No. 493,055, Mar. 5, 1990, abandoned.

[30] Foreign Application Priority Data

Mar. 10, 1989 [IT] Italy .............................. 30624/89[U]

[51] Int. Cl.[5] .......................... A01K 5/02; A01D 90/10
[52] U.S. Cl. ........................................ 366/349; 280/1; 366/186
[58] Field of Search ............... 366/349, 186, 603, 299, 366/184, 42, 49; 280/1, 200, 291, 400

[56] References Cited

U.S. PATENT DOCUMENTS

| | | | |
|---|---|---|---|
| 2,676,002 | 4/1954 | Wolfe . | |
| 2,786,655 | 3/1957 | Cowsert | 366/186 |
| 3,346,239 | 10/1967 | Larson | 366/186 |
| 4,474,478 | 10/1984 | DeLong | 366/186 |
| 4,500,209 | 2/1985 | Steiner et al. | 366/186 X |
| 4,922,463 | 5/1990 | Del Zotto | 366/186 X |

FOREIGN PATENT DOCUMENTS

| | | |
|---|---|---|
| 0003813 | 2/1979 | European Pat. Off. . |
| 0232639 | 12/1986 | European Pat. Off. . |
| 539315 | 12/1931 | Fed. Rep. of Germany ...... 366/186 |
| 2621709 | 12/1977 | Fed. Rep. of Germany . |
| 2076678 | 12/1981 | United Kingdom ................ 366/186 |

*Primary Examiner*—Stuart S. Levy
*Assistant Examiner*—Joseph A. Rhoa
*Attorney, Agent, or Firm*—Guido Modiano; Albert Josif

[57] ABSTRACT

The invention relates to a fibrous product mixing truck having a mixing container (2) with one or more vertical scrolls welded onto corresponding rotating shafts. The container is mounted on a wheeled frame through the interposition of weighing cells (3). A frame (10) of metallic tubes with a substantially quadrangular shape is welded to the container for movably supporting an unloading belt (11) facing an unloading door (7) of the container and movable from a position which is substantially internal to the truck to a position which considerably protrudes therefrom. The frame is rigidly associated with a ladder (14) upwardly connected to an inspection platform (15) and is separated from the container.

3 Claims, 1 Drawing Sheet

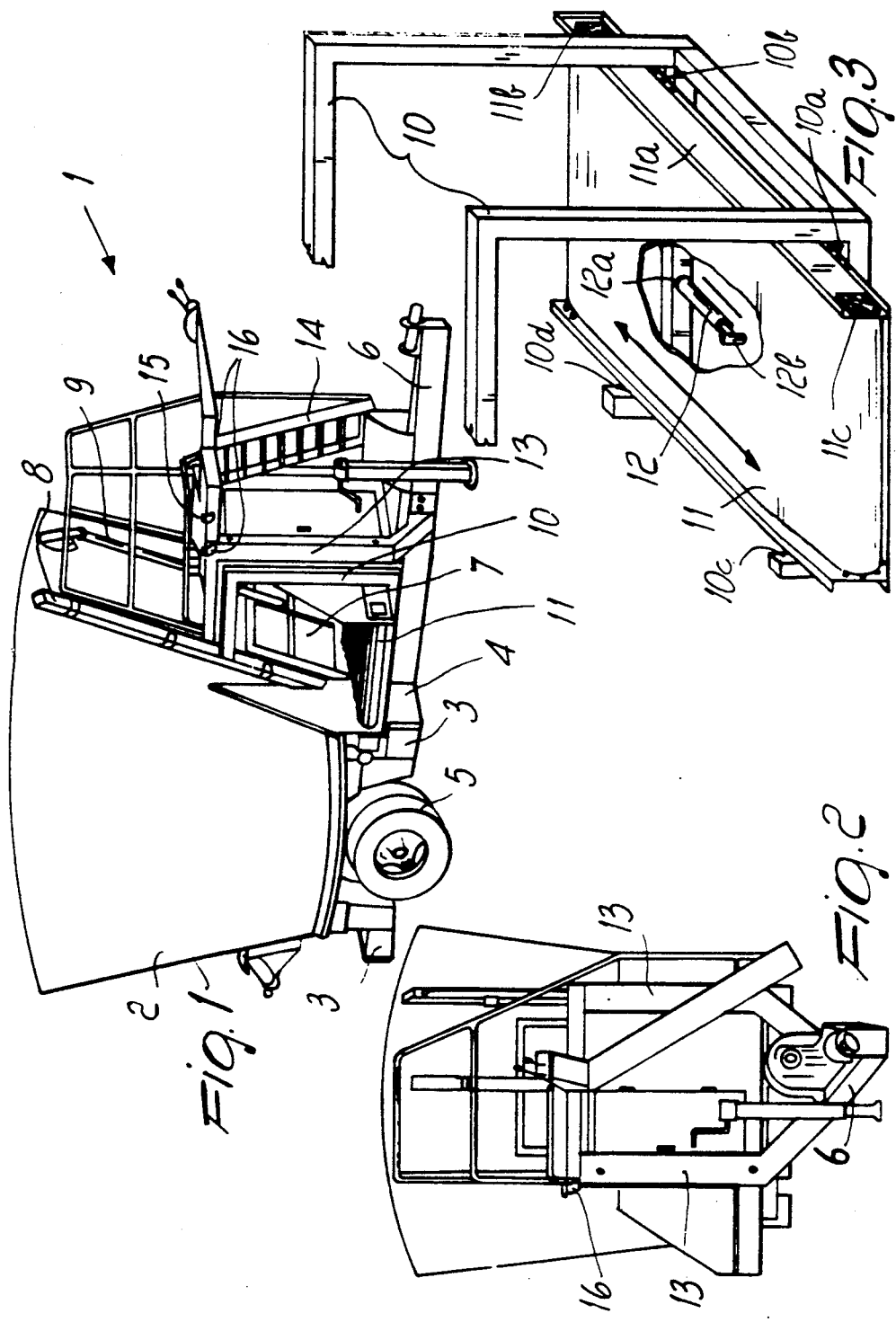

FIBROUS PRODUCT MIXING TRUCK

This is a continuation application of application Ser. No. 07/493,055 filed on Mar. 5, 1990, now abandoned.

BACKGROUND OF THE INVENTION

The present invention relates to a fibrous-product mixing truck particularly but not exclusively for use in the field of zootechnics, of the type indicated in the preamble of claim 1.

Mixing trucks are already currently known and substantially comprise a chassis having wheels adapted to facilitate its transport and rigidly supporting a substantially frustum-shaped container, internally provided with one or more vertical mixing scrolls.

Each scroll is welded to a shaft which is rotationally rigid to end pivots and is rotated by means of appropriate mechanical transmissions which are kinematically connected to actuation elements, such as for example the power take off of a tractor.

The products to be mixed, in particular rough or fibrous forage with protein integrators and minerals together with concentrates such as flours, mashes, pulps etc., are loaded from the top, whereas the product ready for feeding is unloaded through an outlet with a closure door provided on the lateral wall of the container in the front region.

In order to facilitate the distribution of the product, a hydraulically actuated moving belt is arranged below the discharge outlet.

Said known mixing trucks are furthermore provided, in the front part, in practice above said moving belt, with an inspection ladder.

Though it is necessary from a practical point of view, the presence of the moving belt and of the inspection ladder causes considerable problems as regards weighing of the loaded products, which is necessary to obtain the intended dosages of the various substances and to know the exact amount of fodder distributed to the stock.

In some embodiments of said trucks, the moving belt and the ladder are both fixed to the frame and consequently interfere with the movements of the unloading door and compromise weighing.

Other configurations with the ladder and belt fixed to the container have the same problems.

Another disadvantage observed resides in the fact that the moving belt, due to problems related to transport, must not protrude considerably beyond the transverse cross section of the truck and is therefore too short to distribute the mixed product in the required regions.

SUMMARY OF THE INVENTION

The aim of the present invention is to provide a truck for mixing fibrous products which solves the disadvantages described above in the prior art.

A consequent primary object is to provide improvements which can be performed without difficulties on known trucks.

Another important object is to allow the distribution of the fodder at a certain distance from the truck.

Still another object is to provide a truck which allows more precise weighings of the material to be mixed.

Not least object is to provide a truck with improvements which can be performed at low cost with current production means.

This aim, these objects and others which will become apparent hereinafter are achieved by a fibrous product mixing truck, as defined in appended claim 1.

BRIEF DESCRIPTION OF THE DRAWINGS

The characteristics and advantages of the invention will become apparent from the detailed description of an embodiment thereof, illustrated only by way of non-limitative example in the accompanying drawings, wherein:

FIG. 1 is a lateral perspective view of a mixing truck improved according to the invention;

FIG. 2 is a front perspective view of the mixing truck of FIG. 1;

FIG. 3 is a perspective view of a frame which supports a moving belt according to the invention.

DESCRIPTION OF THE PREFERRED EMBODIMENTS

With reference to the above figures, a fibrous product mixing truck is generally indicated by the reference numeral 1 and is substantially constituted by a container 2 in the shape of an inverted truncated cone which is open upward and is conveniently fixed to a rear portion of a chassis or frame 4 with wheels 5, with the interposition of weighing cells 3. Such weighing cells are of a known type which provide an output reading in correspondence to a pressure applied to the cells, as for example a quartz weighing cell having an element whose electrical resistance is a function of the strain applied to the element by the corresponding pressure.

Said frame extends forward from the rear portion with an extension 6 adapted for its coupling to a transport means such as for example a tractor.

Said container 2 is internally provided with a vertical scroll which is not visible in the figures and is welded to a rotating shaft; said scroll has a helical profile arranged along an ideal conical surface.

Said shaft is connected to a mechanical transmission which associates it with actuation elements which are adapted to rotate it and are kinematically connected for example to the power take-off of said tractor, in a per se known manner.

An unloading port, with a related door 7 which is movable in a substantially vertical direction on guides 8 fixed to the container 2 and is actuated by a hydraulic piston 9, is arranged on the wall of the container 2 in the front region thereof.

According to the invention, a fixed support for a movable frame 11a which supports rollers 11b, 11c around which is wound a sliding belt 11 is rigidly associated to the container, the belt supporting movable frame 11a being slidably coupled to the fixed support so as to be movable from a position which is substantially internal to the width of the truck to a position which protrudes considerably therefrom. In particular, the fixed support for the movable frame 11a comprises a substantially quadrangular frame 10 of metal tubes, which is welded to the container 2 at the region of the door 7, while the movable frame 11 with belt 11 is slidably associated to the lower portion of the frame 10.

The translatory motion of the movable frame 11a with belt 11 is conveniently achieved by means of a hydraulic piston 12 which acts between the frame 10 and said belt supporting movable frame 11a (the piston 12 having a first end 12a connected to the fixed frame 10 and a second end 12b connected to the movable frame 11a, for example at a transverse cross member -not shown in the figures-of the movable frame 11a), or the translation motion can be achieved manually by pushing the belt supporting movable frame 11a. The translation motion of the movable frame 11a is such that is slides on guide means associated with the fixed frame 10 such as guiding surfaces 10a, 10b, 10c, 10d of the frame 10, and the movable frame 11a can be, once a desired position thereof is reached, fixedly attached to the fixed frame 10, for example by fixing it with screws to said frame 10.

It should be noted that the frame 10 and the sliding movable frame 11a with belt 11, which are coupled to the container 2, in no way interfere with the frame 4 neither when idle nor during the use of the mixing truck 1 and the weighing of the products contained therein.

Supporting shoulders 13 for a ladder 14 with upper inspection platform 15 are welded to said extension 6 of the frame 4 and extend upward.

Said shoulders 13 are made of metal tubes which conveniently constitute the tank of hydraulic oil for the actuation of the various moving parts, such as the pistons 9 and 12, of the truck 1.

Said shoulders 13 have appropriate upper fillers 16 for this purpose and appropriate oil distribution means (not shown in the drawings) such as tubes are connected between the oil tank shoulders 13 and the pistons 9 and 12.

It should also be noted that the shoulders 13, the ladder 14 and the platform 15 are separate from the container 2 and do not interfere with its movements during the weighing operations. In fact, the particular arrangement as previously described whereby the frame 10 (which supports the movable frame 11a with belt 11) is connected to the container 2, and the shoulders 13 (which support the ladder 14 and platform 15) are connected to the extension 6 of the frame 4, allows the weighing cells 3 to weigh exclusively the container 2 with contents therein and the frame 10 with belt 11 and contents thereon: the shoulders 13 with ladder 14 and platform 15 do not enter into the weighing procedure.

As can be deduced from the above, the intended aim and objects are therefore achieved, improvements having been provided which are adapted to improve the operation of vertical-scroll mixing trucks.

Since the moving belt can translate, it is in fact capable of distributing the mixed product even at a certain distance from the frame, while the weighing action is not biased in any way.

The fact should be furthermore noted that the supporting shoulders of the ladder and of the platform have been used to constitute the hydraulic oil tank, achieving considerable space savings.

The materials employed, as well as the dimensions, may be any according to the requirements.

I claim:

1. A fibrous product mixing truck comprising a mixing container, said truck further comprising:
   a chassis means for supporting said mixing container, said mixing container being mounted on said chassis means at a rear portion thereof and said chassis means defining a forward extension extending forwardly from said rear portion, said chassis means being provided with a wheel means, said forward extension of said chassis means being connectable to appropriate transport means for transporting said chassis means with said mixing container mounted thereon,
   a weighing cell means for weighing products contained in said mixing container,
   an unloading door means provided on said mixing container means for allowing unloading of products contained in said mixing container, said unloading door means facing forwardly form said mixing container to thereby face said forward extension of said chassis means,
   an unloading belt means arranged below said unloading door means for receiving products passing through said unloading door means from said mixing container, said unloading belt means being adapted to convey products contained thereon laterally from said forward extension of said chassis means,
   a belt support frame means for supporting said unloading belt means,
   a ladder and platform means extending upwardly from said forward extension of said chassis means for allowing internal inspection and control of said mixing container upwardly thereof,
   a supporting shoulder frame means for supporting said ladder and platform means,
   wherein said belt support frame means is connected directly to said mixing container thereby said unloading belt means is independent of said forward extension of said chassis means, and wherein said supporting shoulder frame means is connected directly to said forward extension of said chassis means thereby said ladder and platform means is independent of said mixing container, and wherein said weighing cell means is interconnected directly between said mixing container and said rear portion of said chassis means, whereby said weighing cell means weigh directly products contained in said mixing container and products placed on said unloading belt means, independently of said ladder and platform means thereof, and wherein said belt support frame means comprises a fixed support being constituted by a substantially quadrangular frame connected directly to said mixing container and a movable frame which is slidably movable on said fixed support, said movable frame supporting rollers and said unloading belt means being a belt rotatably wound around said rollers, said movable frame being laterally slidable on guiding surfaces defined on said movable frame and said quadrangular frame, said movable frame being slidably movable by means of a fluid-actuated piston means.

2. A fibrous product mixing truck comprising a mixing container, said truck further comprising:
   a chassis mean for supporting said mixing container, said mixing container being mounted on said chassis means at a rear portion thereof and said chassis means defining a forward extension extending forwardly from said rear portion, said chassis means being provided with a wheel means, said forward extension of said chassis means being connectable to appropriate transport means for transporting said chassis means with said mixing container mounted thereon,
   a weighing cell means for weighing products container in said mixing container,
   an unloading door means provided on said mixing container for allowing unloading of products contained in said mixing container, said unloading door means facing forwardly from said mixing container to thereby face said forward extension of said chassis means,
   an unloading belt means arranged below said unloading door means for receiving products passing through said unloading door means form said mixing container, said unloading belt means being adapted to convey products contained thereon laterally from said forward extension of said chassis means, a belt support frame means for supporting said unloading belt means, a ladder and platform means extending upwardly from said forward extension of said chassis means for allowing internal inspection and control of said mixing container upwardly thereof, a supporting shoulder frame means for supporting said ladder and platform means, wherein said belt support frame means is connected directly to said mixing container thereby said unloading belt means is independent of said forward extension of said chassis means, and wherein said supporting shoulder frame means is connected directly to said forward extension of said chassis means thereby said ladder and platform means is independent of said mixing container, and wherein said weighing cell means is interconnected directly between said mixing container and said rear portion of said chassis means, whereby said weighing cell means weigh directly products contained in said mixing container and products placed on said unloading belt means, independently of said ladder and platform means thereof, and wherein said belt support frame means comprises a fixed support being constituted by a substantially quadrangular frame connected directly to said mixing container and a movable frame which is slidably movable on said fixed support, said movable frame supporting rollers and said unloading belt means being a belt rotatably wound around said rollers, said movable frame being laterally slidable on guiding surfaces defined on said movable frame and said quadrangular frame, said movable frame being slidably movable by means of a fluid-actuated piston means, said unloading door means being a sliding door, said door being slidable on guides provided externally on said mixing container, said door being slidably movable on said guides by means of a fluid-actuated cylinder means, said supporting shoulder frame means for supporting said ladder and platform means being a pair of shoulders connected directly to said forward extension of said chassis means and extending upwardly therefrom, said shoulders being made of metal tubes which constitute a tank for hydraulic oil, distribution means being provided which are interconnected between said tank and said piston means and said cylinder means for actuation thereof.

3. A fibrous product mixing truck comprising:

a mixing container, a chassis which supports said mixing container, said mixing container being mounted on said chassis at a rear portion thereof and said chassis defining a forward extension extending forwardly from said rear portion, said chassis being provided with wheels, said forward extension of said chassis being connectable to appropriate means for transporting said chassis with said mixing container mounted thereon, a weighing cell for weighing products contained in said mixing container, an unloading door being provided on said mixing container for allowing unloading of products contained in said mixing container, said unloading door being arranged facing forwardly from said mixing container to thereby face said forward extension of said chassis, an unloading belt arranged below said unloading door for receiving products passing through said unloading door from said mixing container, said unloading belt being adapted to convey products contained thereon laterally from said forward extension of said chassis, a belt support frame for supporting said unloading belt, a ladder and platform extending upwardly from said forward extension of said chassis for allowing internal inspection and control of said mixing container upwardly thereof, a supporting shoulder frame for supporting said ladder and platform, wherein said belt support frame is connected directly to said mixing container thereby said unloading belt is independent of said forward extension of said chassis, and wherein said supporting shoulder frame is connected directly to said forward extension of said chassis thereby said ladder and platform is independent of said mixing container, and wherein said weighing cell is interconnected directly between said mixing container and said rear portion of said chassis, whereby said weighing cell weighs directly products container in said mixing container and products placed on said unloading belt, independently of said ladder and platform thereof.

* * * * *